United States Patent
Dickens et al.

(10) Patent No.: US 7,631,038 B2
(45) Date of Patent: Dec. 8, 2009

(54) PXE SERVER WITH MULTIPLE PROVIDER MODEL

(75) Inventors: Christopher Scott Dickens, Issaquah, WA (US); Asad Yaqoob, Redmond, WA (US); Saad Syed, Kirkland, WA (US); Patrick B. Azzarello, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 673 days.

(21) Appl. No.: 11/358,479

(22) Filed: Feb. 21, 2006

(65) Prior Publication Data

US 2007/0198652 A1    Aug. 23, 2007

(51) Int. Cl.
    *G06F 15/16*    (2006.01)
(52) U.S. Cl. .................. 709/203; 709/219; 709/222; 709/232; 713/2
(58) Field of Classification Search .................. 709/203, 709/217, 219, 222, 232; 713/1, 2
    See application file for complete search history.

(56) References Cited

U.S. PATENT DOCUMENTS

| | | | |
|---|---|---|---|
| 5,933,631 A * | 8/1999 | Mealey et al. ................... | 713/2 |
| 6,807,558 B1 | 10/2004 | Hassett et al. | |
| 6,816,964 B1 * | 11/2004 | Suzuki et al. ................... | 713/2 |
| 7,251,725 B2 | 7/2007 | Loison et al. | |
| 7,305,561 B2 * | 12/2007 | Hunt et al. ................... | 713/182 |
| 7,330,118 B2 * | 2/2008 | Durham et al. ................ | 340/572.1 |
| 7,398,382 B2 * | 7/2008 | Rothman et al. ............... | 713/2 |
| 7,467,295 B2 * | 12/2008 | Erickson et al. ................ | 713/2 |
| 2002/0120721 A1 | 8/2002 | Eilers et al. | |
| 2002/0198972 A1 | 12/2002 | Babbitt et al. | |
| 2003/0005096 A1 | 1/2003 | Paul et al. | |
| 2003/0131152 A1 * | 7/2003 | Erlingsson ................... | 709/328 |
| 2004/0081104 A1 * | 4/2004 | Pan et al. ..................... | 370/254 |
| 2005/0180326 A1 * | 8/2005 | Goldflam et al. ............. | 370/231 |
| 2006/0143432 A1 | 6/2006 | Rothman et al. | |
| 2007/0083748 A1 * | 4/2007 | Erickson et al. ................ | 713/2 |
| 2007/0157016 A1 * | 7/2007 | Dayan et al. ................... | 713/2 |
| 2008/0046708 A1 * | 2/2008 | Fitzgerald et al. ............. | 713/2 |

FOREIGN PATENT DOCUMENTS

JP            2002169694         6/2002

OTHER PUBLICATIONS

3Com Corporation, "What is PXE?," White Paper Intel PXE Presentation, Apr. 1998, 8 pages.

* cited by examiner

*Primary Examiner*—Oanh Duong
(74) *Attorney, Agent, or Firm*—Senniger Powers LLP (57) ABSTRACT

Multiple providers of application logic are used to deploy and install an operating system image to a client. Each provider configured with application logic designed to deploy and install an operating system image to a distinct class of clients. When a server receives a request associated with deploying and installing the operating system image from the client, the server sends the request to the provider configured with application logic designed to deploy and install an operating system to the client.

18 Claims, 6 Drawing Sheets

PXE SERVER WITH MULTIPLE PROVIDER MODEL

BACKGROUND

When deploying an operating system to multiple computing devices, it is beneficial to utilize tools to automate the deployment process. For example, in a computing device manufacturing process, an original equipment manufacturer (OEM) typically installs an operating system (OS) with standard configurations or a standard OS to the computing device before customers purchase them at retail stores or over the Internet. In a corporate setting, a business may need to upgrade a number of identically configured machines simultaneously and efficiently using such automated process.

Typically, the standard OS is deployed and installed automatically to the computing devices by copying or duplicating a pre-determined OS image to the computing device for booting the computing device. For example, the automated deployment and installation process would install the OS with standard configurations on a memory storage area of each of the computing devices via a wired or a wireless connection. Upgrades to OS or other applications may be installed in a similar fashion.

However, with the ongoing advancements and developments in storage medium and computing device processing powers, installing a standard set of OS image to a number of computing devices no longer accounts for proper configuration of the computing devices.

One available system, Pre-Boot Execution Environment (PXE) protocol, allows a client to obtain an OS image from a PXE server in a networked environment. The client initiates the PXE process by broadcasting a PXE request in the networked environment. However, any PXE server listening for a request can read and choose to respond to the client. A disadvantage results if more than one PXE server exists in the networked environment because the client will be serviced by whichever PXE server responds the quickest to the client request. For example, if two PXE servers are in the networked environment, the first configured with application logic to service any type of device (e.g. personal computers, point of sale devices, and network servers) and a second configured to service point of sale devices, it is not possible to determine which PXE server will be the first to respond to the request from a point of sale device client. Therefore, using the PXE protocol, it is possible that the point of sale device may incorrectly receive a boot image for a personal computer.

In addition, not only does an entity needs to deploy an OS on a number of different classes of computing devices, from personal digital assistant (PDA), to server computers, to point of sale terminals, the entity also needs to consider that each class of the computing devices may require particular configurations due to hardware components. For example, a PDA X with a chip having a processing power of 500 MHz and a storage memory capacity of 5 GB may require a different OS image from another PDA Y in the same production line with a chip having a processing power of 733 MHz and a storage memory capacity of 10 GB. As such, the existing OS image deployment systems of installing an OS with standard configuration or a standard OS image would not properly configure the PDA Y because both PDA X and PDA Y would receive the same OS image for booting the devices. In addition, current OS image deployment systems lack the ability to properly detect differences in hardware components in the computing devices to efficiently deploy and install appropriate OS images to the computing devices.

SUMMARY

Embodiments of the invention include methods to separate core networking capability from the application logic in a server used to deploy and install an operating system image to a client. When the server receives a request associated with deploying and installing the operating system image from the client, the server sends the request to a provider, the provider configured with application logic to respond to the request. Once the provider generates a response to the request, the response is sent to the server. The server then composes a response packet and sends the response packet to the client.

In another embodiment, multiple providers are implemented, each provider configured with application logic designed to deploy and install an operating system image to a distinct class of clients. When the server receives a request associated with deploying and installing the operating system image from the client, the server sends the request to one of the providers. The provider configured with application logic to service to the request will generate a response to the request. Once a provider generates a response to the request, the response is sent to the server. The server then composes a response packet and sends the response packet to the client.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
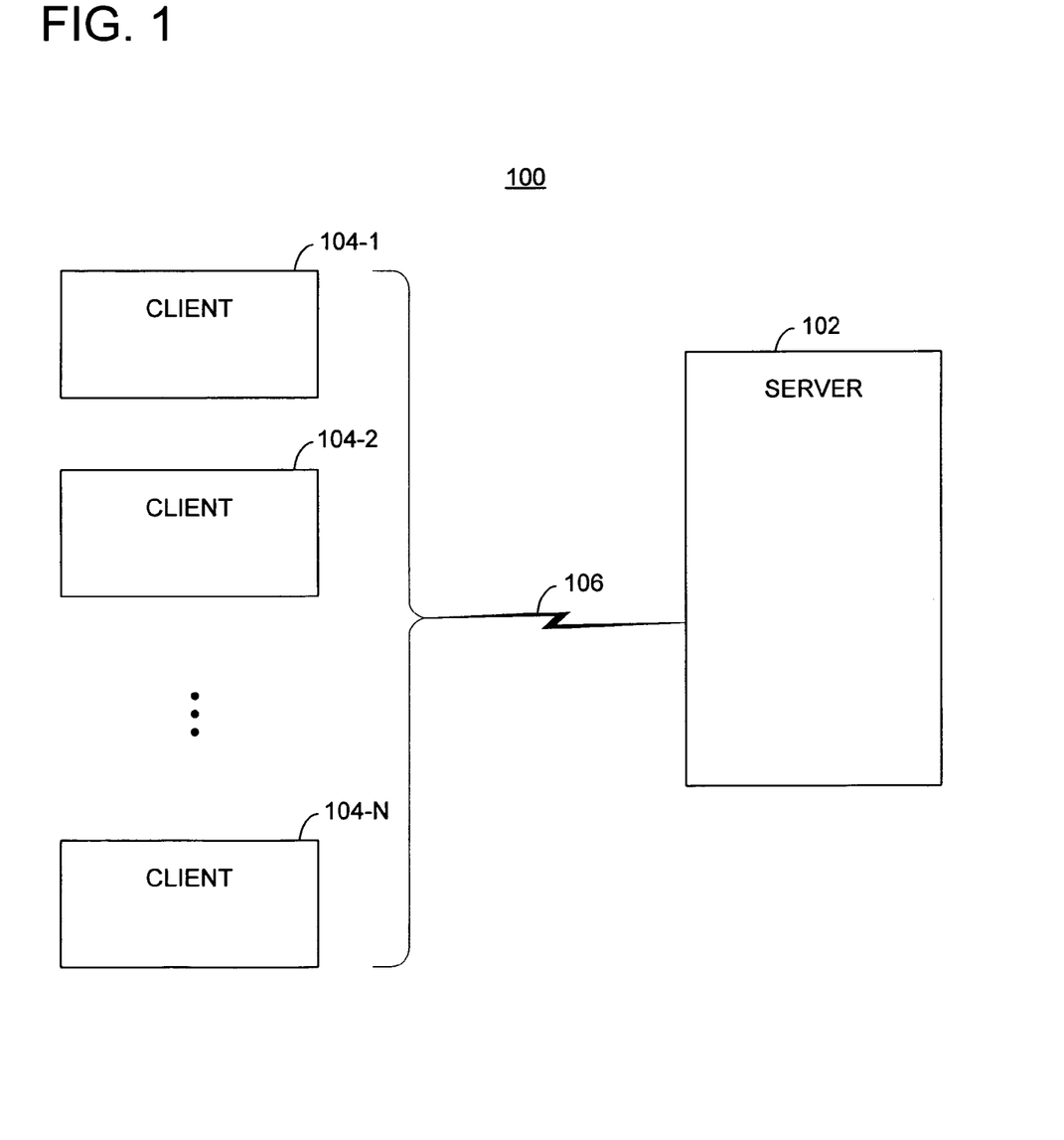
FIG. 1 is a block diagram illustrating an exemplary system for implementing embodiments of the invention.

Referring to FIG. 1, the system 100 illustrates an exemplary embodiment in which aspects of the invention may be implemented. A server 102, which may be one of a plurality of servers, includes components that enable the deployment of an operating system (OS) to a plurality of clients 104 via a networked environment 106. In one embodiment, the server 102 deploys the OS, such as MAC® OS X, UNIX®, Linux®, or Windows Vista™ operating system to the clients 104. The server 102 and the clients 104 may communicate via a number of underlying network transport mechanisms available in the networked environment 106. In one embodiment, the transport mechanisms include, Transmission Control Protocol (TCP), Trivial File Transfer Protocol (TFTP), User Datagram Protocol (UDP), Remote Procedure Call (RPC), File Transfer Protocol (FTP), HyperText Transfer Protocol (HTTP), or the like. In one example, server 102 in system 100 includes a server 200 described in FIG. 2.

The clients 104 include one or more computing devices, such as a desktop computer, a laptop computer, a personal digital assistant (PDA), or other devices. In another embodiment, server 102 and each of the clients 104 implement at least a part of a computer 130 depicted in FIG. 3.

In one example, system 100 may be used in a pre-boot execution environment (PXE). For example, server 102 may be a PXE server which watches for dynamic host configuration protocol (DHCP) discovery requests that include a special tag identifying the client as a PXE client. If the discovery request includes the tag, the PXE server replies to the client with configuration information, including the name of a boot image file, which may include an OS boot image, pre-OS image file, pre-boot agents (e.g., computer-executable instructions for scanning clients 104 for viruses before installing an OS). The boot image file may transferred to clients 104 using TFTP, and the transferred file may be used to boot the clients 104.

Figure 2:
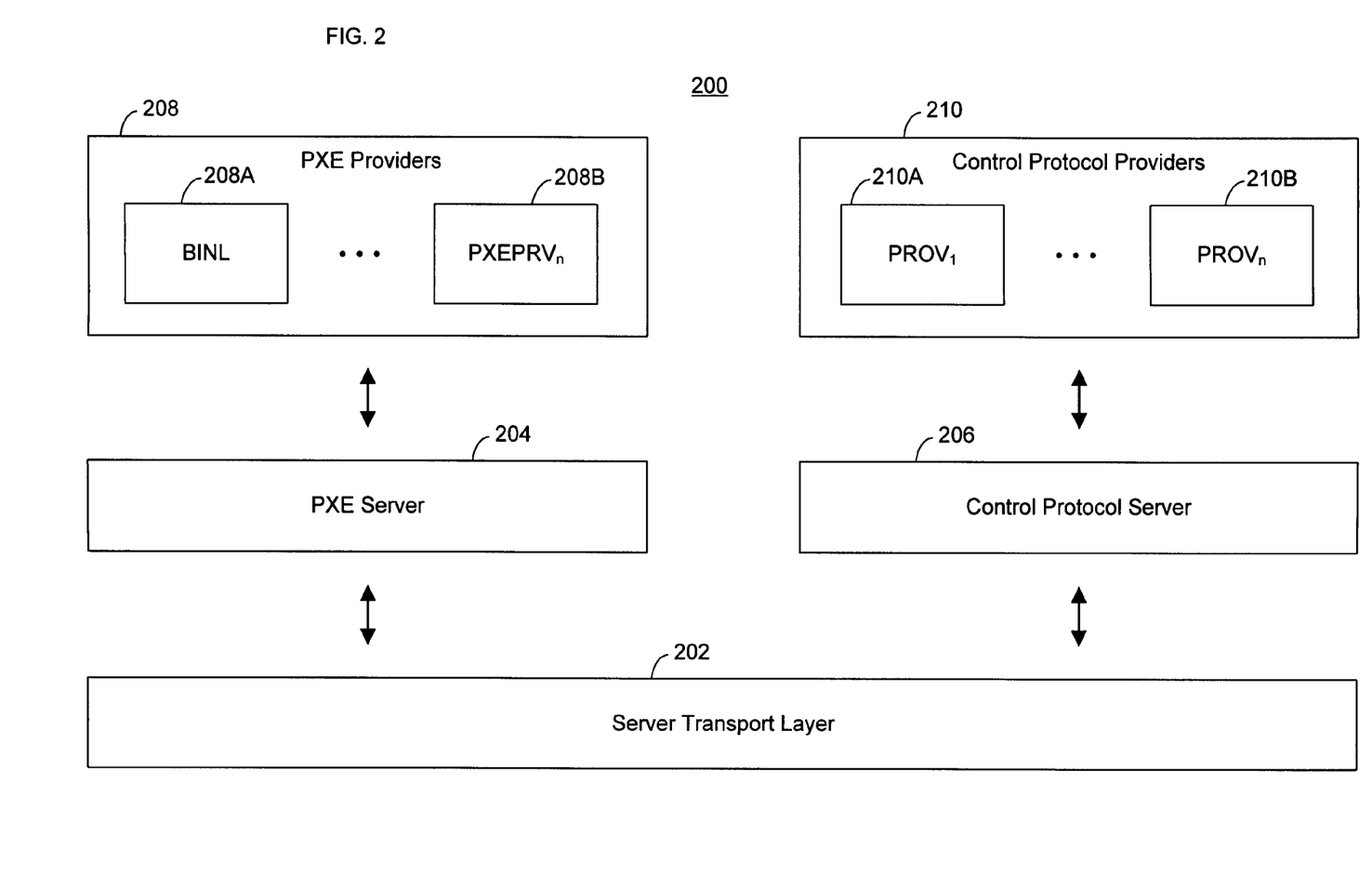
FIG. 2 is a block diagram illustrating an exemplary pre-boot environment according to an embodiment of the invention.

Referring now to FIG. 2, an exemplary embodiment of the server 200 of the invention is shown. The server 200 includes one or more components, such as a transport layer 202, a PXE server 204, and a Control Protocol Server 206. The transport layer 202 handles the details associated with communicating with clients and provides a transport-independent communication mechanism to the PXE Server 204 and the Control Protocol Server 206. In one embodiment, the transport layer 202 may communicate with the clients 104 utilizing a variety of network protocols including Transmission Control Protocol (TCP), User Datagram Protocol (UDP), Remote Procedure Call (RPC), and HyperText Transfer Protocol (HTTP).

The PXE server 204 accepts PXE requests from the clients 104. PXE is one of the components of the Wired for Management (WfM) specification that allows the clients 104 to boot from the PXE server 204 on a network prior to booting an operating system from a hard drive local to the clients 104. After receiving the PXE request from the client, the PXE server passes the request to a PXE provider 208. The PXE provider 208 is a component containing the application logic to formulate a response to the clients 104. In one embodiment, the PXE provider 208 is Boot Information Negotiation Layer 208A (BINL). The responsibilities of the BINL service 208 include answering the request, querying a directory service on behalf of the clients 104, as well ensuring that the correct policy and configuration settings are applied to the clients 104 during the operating system installation. In another embodiment, the PXE provider 208 includes two or more PXE providers 208, each with distinct application logic.

The Control Protocol Server 206 accepts requests from a reduced operating system environment. The reduced operating system aids in the deployment of the operating system. In one embodiment, the Control Protocol Server 206 accepts Microsoft® Windows® Preinstallation Environment (WinPE) requests. After receiving the request from the clients 104, the Control Protocol Server 206 passes the request to a Control Protocol Provider 210. The Control Protocol Provider 210 is a component containing the application logic to formulate a response to the clients 104. In one embodiment, the Control Protocol Provider 210 includes a plurality of providers, such as 210A, and 210B.

It is also to be understood that additional components connected, wired or wirelessly, to the server 200 may be added to perform operations of the transport layer 202, the PXE server 204, and the control protocol server 206.

Initially, a client (e.g., client 104-1) attempts to request to be booted by a server (e.g., PXE server 204). The request is received by the server which may be coupled with one or more other servers (e.g., a Control Protocol Server 206) or PXE providers for responding to the request.

In existing OS boot image file deployment systems, the server responds to the request by sending a standard or a predetermined OS boot image file to the client. For example, suppose the clients sending the requests include computing devices with 32-bit architecture and computing devices with 64-bit architecture. Current deployment systems would, regardless of the different computing architecture configurations, respond the request by sending a generic or standard OS boot image file. As such, all clients, either with 32-bit or 64-bit architecture, will receive the same boot image file (e.g., 32-bit boot image file). As such, under current deployment systems, the computing devices with 64-bit architecture need to perform additional evaluation and detection before sending another request to the server for a more appropriate OS boot image file, the 64-bit OS image, before the computing devices can boot accordingly.

Figure 4:
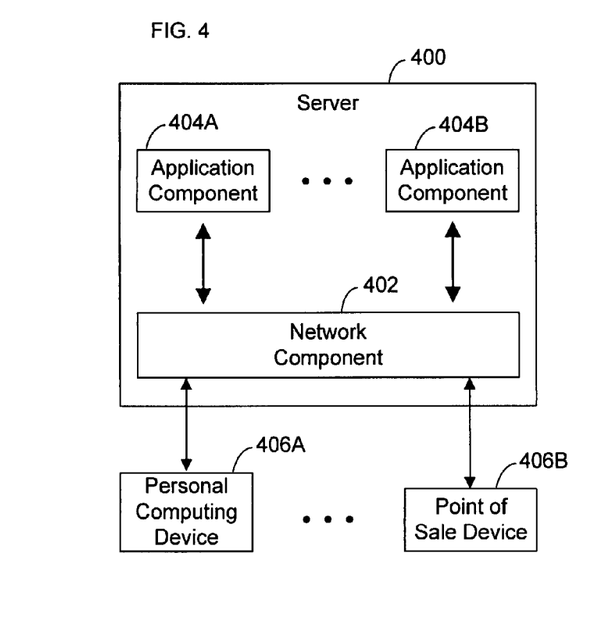
FIG. 4 is a block diagram illustrating an exemplary pre-boot environment according to an embodiment of the invention.

In FIG. 4, a server of an embodiment of the invention is illustrated. The server 400 includes two components, a network component 402 and one or more application components 404. The network component 402 listens for request packets from the client 406, sends the request packet to the application component 404, receives a response from the application component 404, composes a response packet, and sends the response packet to the client 406. In another embodiment, the request packet is a PXE packet. In yet another embodiment, the request packet is a Control Protocol packet.

In an embodiment of the invention, the network component 402 sends the response packet to the client 406 via the server transport layer 202. The server transport layer 202 is independent of the network component 402 and is responsible for handling details associated with communicating with the clients 406. This architecture removes the redundancy of implementing server transport layers 202 for each network component 402, such as the PXE server 204 and the control protocol server 206. The transport layer 202 may communicate with the client 406 utilizing a variety of network protocols, as noted above. Additionally, since server transport layer 202 provides transport-independent communication, it also allows addition of protocols in future without requiring changes to the network component 402.

The application component 404 receives the request packet from the network component 402, formulates a response to the client 406, and sends the response to the network component 402. In one embodiment, the request packet is a PXE packet. In another embodiment, the request packet is a Control Protocol packet. The application component 402 contains the application logic needed to respond to the client request. For example, the application component 404 examines the contents of the request packet. From this examination, the application component 404 will formulate a response to the client request. In one embodiment, the application component 404 may refuse to service a client request. In another embodiment, the application component 404 may perform an operation to service a PXE request. In yet another embodiment, the application component 404 may perform an operation to service a Control Protocol request.

In an embodiment of the invention, the server consists of one network component 402 and multiple application components 404A, 404B. This allows the server 400 to have one network component 402 to receive a request from a client 406 while allowing for multiple application components 404A, 404B. Each application component 404A, 404B is configured with application logic to respond to distinct classes of clients 406A, 406B. For example, in a PXE server of the present invention, the network component 402 would listen on the network for PXE requests. The PXE server consists of multiple application components 404A, 404B, each servicing a distinct class of clients 406A, 406B.

In operation, following the above example, a client 406A belonging to the personal computing device class would send a request to the server 400. The network component 402 would receive the request and send it to the application component 404A that contains the application logic to service the class of clients. The application component 404A would formulate a response to the client 406A and send that response to the network component 402. The network component 402 would then compose a response packet and send it to the client 406A.

Similarly, a client 406B belonging to the point of sale device class would send a request to the server 400. The network component 402 would receive the request and send it to the application component 404B that contains the application logic to service the class of clients. The application component 404B would formulate a response to the client 406B and send that response to the network component 402. Thus, the PXE server embodiment of the invention could service distinct classes of clients determinately. Furthermore, while the example illustrated a PXE server embodiment, other embodiments of the invention encompass other servers used to deploy and install operating systems including a Control Protocol Server. In other embodiments, device classes may include server computers, personal digital assistants (PDA), and digital entertainment computers.

Figure 5:
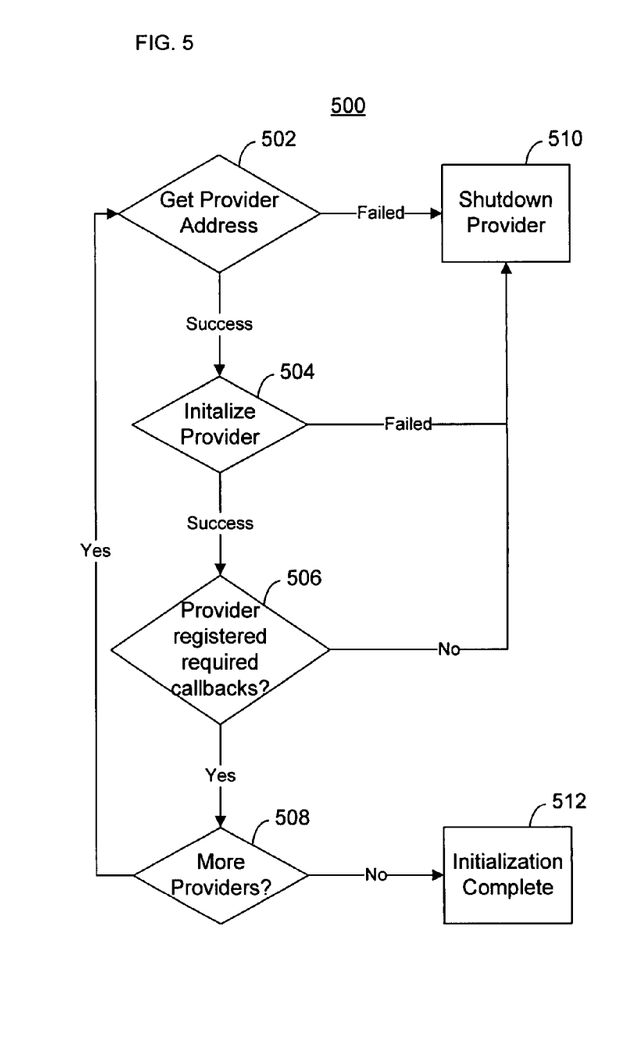
FIG. 5 is an exemplary flow diagram of a method of initializing providers of one embodiment of the invention.

FIG. 5 illustrates an embodiment of the invention where providers 208, 210 register with the server 204, 206 at installation. For example, in one embodiment PXE providers 208A, 208B would register with a PXE server 204. In another embodiment, Control Protocol providers 210A, 210B would register with a Control Protocol Server 206. At 502, when the server 204, 206, 400 is started, the process 500 obtains an address and the name of an initialization function for each installed provider 208, 210, 404. In one embodiment, the provider information is stored in a list in a central database used by the operating system to configure the system for users, applications, and hardware devices such as the Windows® registry.

During installation in this embodiment, providers 208, 210 are required to export a single initialization function to the server 204, 206. The server 204, 206 will call the initialization function to the provider 208, 210. In an embodiment where the provider information is stored in the Windows® registry, the server 204, 206 will store information related to the providers 208, 210 under HKLM\System\CurrentControlSet\Services\WDSServer.

Each provider will be registered as:

```
WDSServer
    Providers
        WDSPXE
            Providers
                <Provider-Name>
```

-continued

```
ProviderDLL="<Full Path to Module>"
InitRoutine="<Initialization Function>"
```

The order the providers will be registered as:

```
WDSServer
    Providers
        WDSPXE
            ProvidersOrder="<ordered list of providers>"
```

At 504, the first provider initialization function is executed to initialize the provider 208, 210. If an error occurs at 504, the provider 208, 210 is shutdown at 510. During a successful initialization, the provider 208, 210 will register one or more callbacks. A callback is a pointer to the function of the provider that should be called by the server when a particular event occurs. For example, provider functions include the function to receive the packet from the server and the function to shut down the provider. In one embodiment, the provider 208, 210 is required to register at least one callback for the function to receive the packet from the server. At 506, the required registered callbacks are validated. If any required callbacks have not been registered, the provider 208, 210 is shutdown at 510. At 508, a check is made to see if more providers are available. If so, the processing continues at 502 for the next provider. If there are no more providers available then all providers have been initialized at 512.

Figure 6:
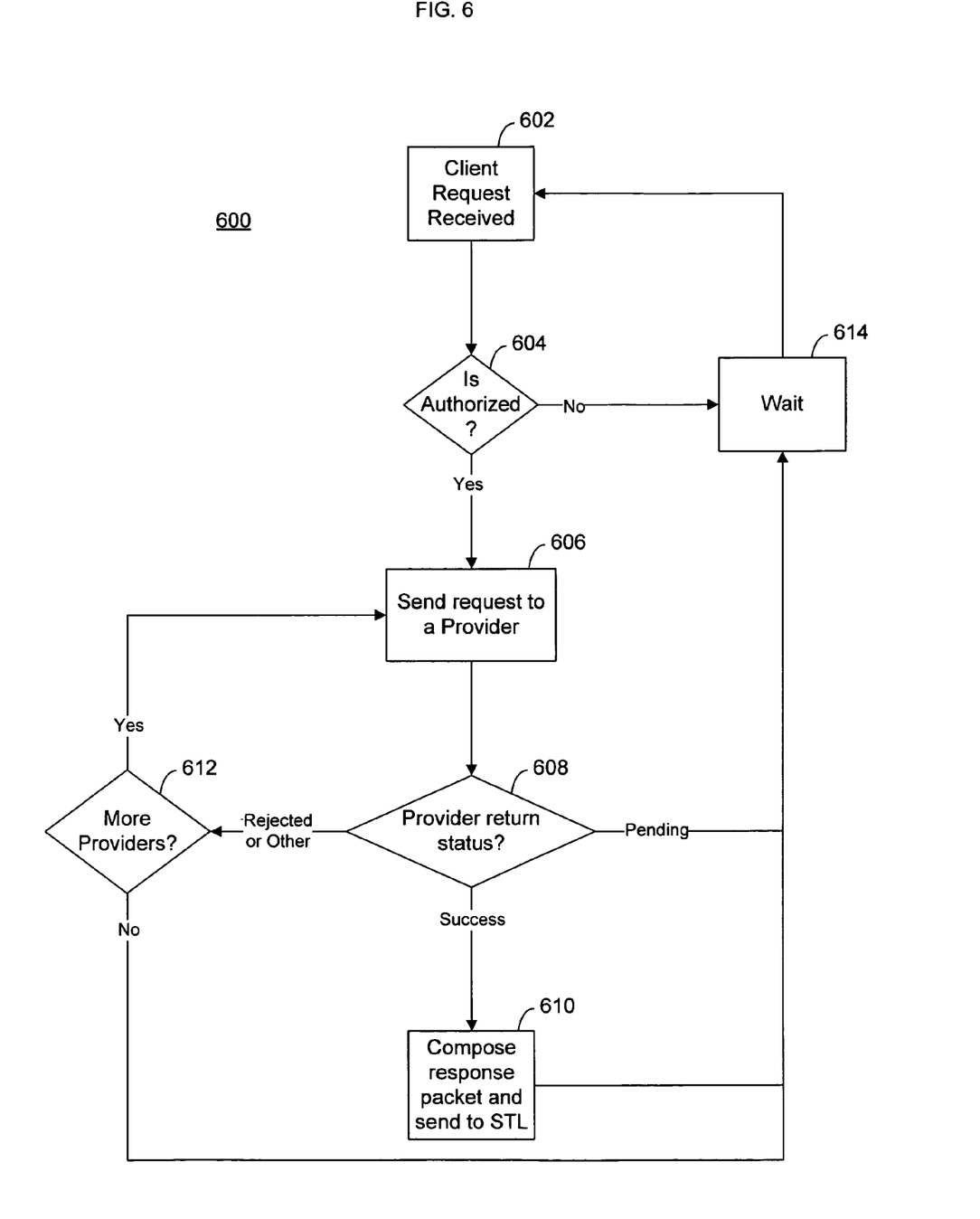
FIG. 6 is an exemplary flow diagram of a method of processing client requests of one embodiment of the invention.

In FIG. 6, a method of an embodiment of the invention is illustrated. At 602, a request is received from a client. At 604, a check is made to see if the client is authorized. If the client is authorized, at 606, the request is sent to a provider 208, 210. In one embodiment, the request is sent to an initialized provider. In another embodiment, the request is sent to the first initialized provider in a provider list. If the client is not authorized, the request is ignored and the process 600 waits at 614 until the next request is received.

At 608, a status code is returned from the provider. In one embodiment, a provider who receives a request will return a status indicating that the provider has completed servicing the request, that the provider is in the process of servicing the request, or that the provider will not service the request. If the status code indicates that the provider has completed servicing the request, at 610, a response packet is composed and sent the server transport layer for transmission to the client. A provider may choose to service the request asynchronous and return the status code indicating that the provider is in the process of servicing the request. The process 600 will wait at 614 until the next request is received or until the provider returns a status code indicating that the provider has now completed servicing the client request.

If, at 608, the status code indicates that the provider will not service the request, at 612 the process 600 checks to see if another provider is available. If so, the request is sent to another provider at 606. In no other providers are available, the process waits at 614 until the next request is received.

Figure 7:
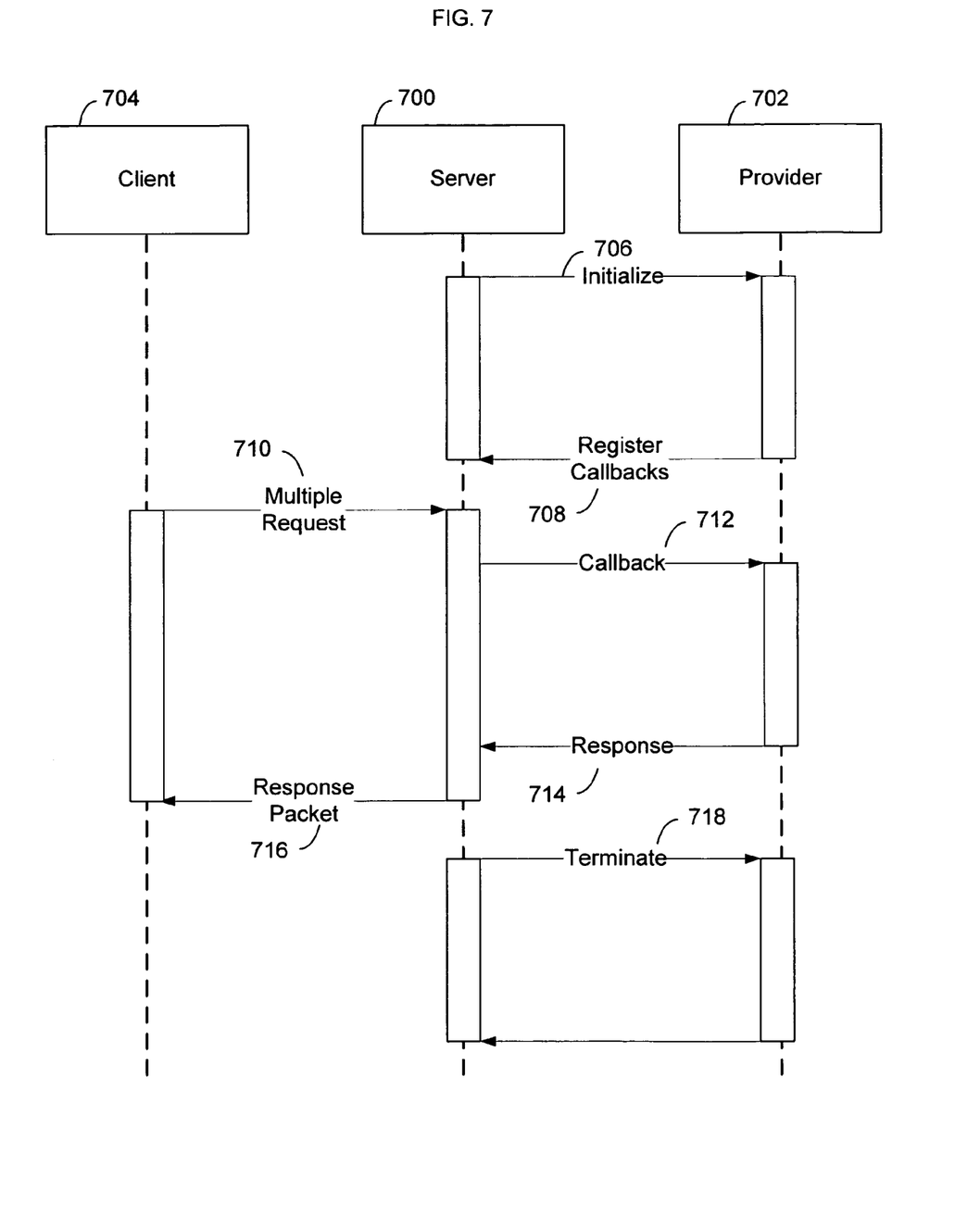
FIG. 7 is an exemplary flow diagram illustrating the servicing of client requests in a pre-boot environment according to an embodiment of the invention.

FIG. 7 provides a system overview of an embodiment of the invention. At startup, the server 700 sends an initialization request 706 to the provider 702. The provider 702 responds by registering callbacks 708 with the server 700. As described in detail above with respect to FIG. 5, the server 700 will send an initialization request 706 to each available provider 702 until all providers 702 have an opportunity to register callbacks 708.

After the providers 702 have been initialized, the server 700 waits to receive a request 710 from client 704. The server 700 sends the request to a provider by calling the registered callback 712 of the provider 702. The provider 702 applies its application logic and formulates a response to the request 710. As described in detail above with respect to FIG. 6, the provider 702 may decline to respond to the request 710 and the server will then send the request via the registered callback 712 of the next available provider 702. If no further providers 702 are available, the server 700 will ignore the request 710.

If the provider 702 formulates a response to the request 710, the response 714 is returned to the server 700. The server 700 then composes a response packet 716 and sends the response packet 716 to the client 704 via the transport layer 202. The server 700 may shutdown the provider 700 via a registered termination callback 718. The server may shutdown the provider due to a server shutdown or due to an error from the provider.

Figure 3:
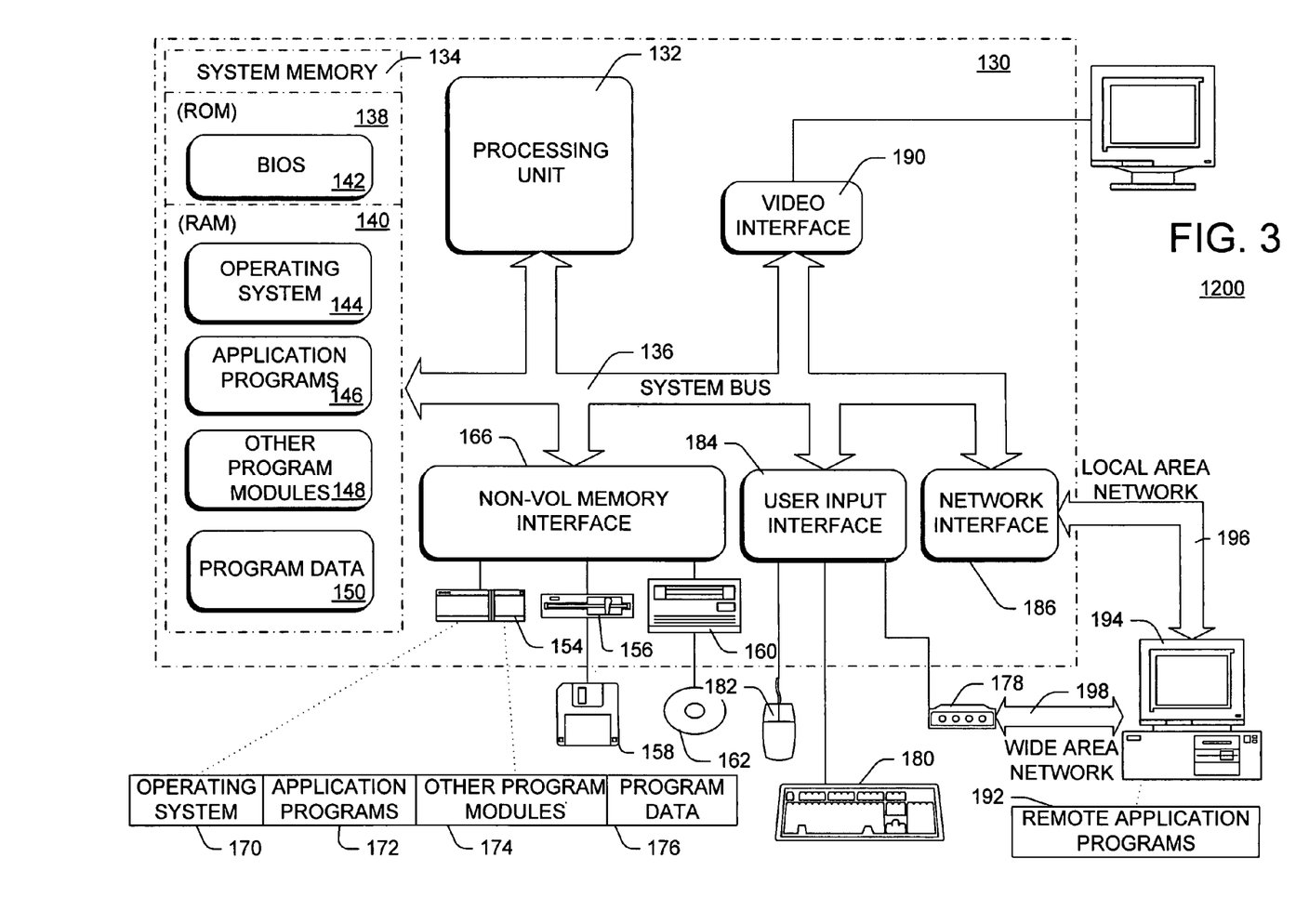
FIG. 3 is a block diagram illustrating one example of a suitable computing system environment in which the invention may be implemented.

Referring now to FIG. 3, one embodiment of a general purpose computing device in the form of a computer 130 is illustrated. A computer such as the computer 130 is suitable for use in the other figures illustrated and described herein, such as FIG. 1. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 8 illustrates operating system 144, application programs 146, other program modules 148, and program data 150.

The computer 130 may also include other removable/non-removable, volatile/nonvolatile computer storage media. For example, FIG. 8 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 8, provide storage of computer readable instructions, data structures, program modules and other data for the computer 130. In FIG. 8, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 8 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 8 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A server in a networked environment for installing an operating system boot image on a client in the networked environment, said operating system boot image specific for a configuration of the client, said configuration of the client different from a configuration of at least one other client of a plurality of clients in the networked environment, said server comprising:
   one or more computer readable storage media for storing a network component and a plurality of application components;
   the network component, said network component receiving a first packet from the client in the networked environment, said first packet relating to selecting and installing the operating system boot image, said first packet comprising operating system information about the configuration of the client; and
   the plurality of application components, each of the plurality of application components configured with application logic for a different configuration of the client, said network component selecting one of the application components as a function of the configuration of the client as indicated by the operating system information in the first packet, said selected application component receiving the first packet from the network component, said selected application component parsing the first packet and generating a response to the parsed packet, said generated response comprising the specific operating system boot image for the determined configuration of the client wherein the generated boot image is not a pre-existing image stored in memory, said application component transmitting the response to the network component,
   wherein the network component formats the transmitted application response into a second packet and transmits said second packet to the client via the networked environment, said second packet executable by the client for selecting and installing the specific operating system boot image on the client.

2. The server of claim 1, wherein the network component determines if the client is authorized, the network component sending the packet to the application component only if the client is authorized.

3. The server of claim 1, wherein the class of clients include personal computers, server-class computers, personal digital assistants (PDA), digital entertainment computers and point-of-sale devices.

4. The server of claim 1, wherein the application component returns a status code to the network component.

5. The system of claim 4, wherein the status code indicates at least one of the following: the application component will not service the client, the application component has completed servicing the client, and the application component is in the process of servicing the client.

6. The system of claim 1, wherein the application component is required to register a callback function.

7. The system of claim 6, wherein the required callback function includes one or more of the following functions: a function to shutdown the application component and a function to receive the packet from the server.

8. A server for installing an operating system boot image on a client via a Pre-Boot Execution Environment (PXE) boot process in a networked environment, said operating system boot image specific for a configuration of the client, said server comprising:
   one or more computer-readable storage media for storing a PXE packet containing communications relating to selecting and installing the operating system boot image, said PXE packet being transmitted via the networked environment, said PXE packet comprising information about the configuration of the client;
   a PXE server receiving a first PXE packet from the PXE client via the networked environment; and
   a plurality of PXE providers on the PXE server, each of said PXE providers configured with application logic for a different configuration of the PXE client, one of said plurality of PXE providers selected by the PXE server as a function of the configuration of the client as indicated by the information in the PXE packet, said one of the plurality of PXE providers implementing the steps of:
   receiving the first PXE packet from the PXE server;
   parsing the first PXE packet;
   generating a response to the parsed first PXE packet, said generated response comprising the operating system boot image specific for the determined configuration, and providing the specific operating system boot image; and
   sending the generated response to the PXE server,
   wherein the PXE server formats the received response into a second PXE packet and transmits the second PXE packet to the PXE client via the networked environment, said second PXE packet relating to selecting and installing the specific operating system boot image on the client.

9. The server of claim 8, wherein the class of PXE clients include personal computer, server-class computers, personal digital assistants (PDA), digital entertainment computers and point-of-sale devices.

10. The server of claim 8, wherein the PXE provider returns a status code to the PXE server in response to receiving the first PXE packet.

11. The server of claim 10, wherein the status code indicates at least one of the following: the PXE provider will not service the PXE client, the PXE provider has completed servicing the PXE client, and the PXE provider is in the process of servicing the PXE client.

12. The server of claim 8, wherein the plurality of PXE providers are required to register a callback function.

13. The server of claim 12, wherein the required callback function includes one or more of the following functions: a function to shutdown the PXE provider and a function to receive the PXE packet from the PXE server.

14. The system of claim 8, wherein the specific operating system boot image is not a pre-existing image stored in memory.

15. A method for installing an operating system boot image on a client in a networked environment, said operating system boot image specific for a configuration of the client, said method comprising:

transmitting a first packet from the client to a PXE (Pre-Boot Execution Environment) server via the networked environment, said transmitting comprising including information about the configuration of the client in the first packet;

receiving, by the PXE server, the transmitted first packet;

receiving, by a provider, the first packet from the PXE server, said receiving by the provider comprising selecting the provider from a plurality of providers by the PXE server as a function of the configuration of the client as indicated by the information in the first packet, each of said plurality of providers configured with application logic for a different configuration of the client;

parsing, by the provider, the received first packet;

generating, by the provider, a response to the parsed first packet, said generated response comprising the operating system boot image specific for the determined configuration;

sending, by the provider, the response to the PXE server;

formatting, by the PXE server, the response received from the client into a second packet; and transmitting, by the PXE server, the second packet to the client via the networked environment wherein the PXE server and the plurality of providers re located in a sever, wherein the PXE server and the plurality of providers are located in a server.

16. The method of claim 15, further comprising:

determining, by the PXE server, if the client is authorized; and sending, by the PXE server, sending the received packet to the provider only if the client is authorized.

17. The method of claim 15, further comprising:

generating, by the provider, a status code;

returning, by the provider, the status code to the PXE server.

18. The method of claim 15, wherein the specific operating system boot image is not a pre-existing image stored in memory.

* * * * *

UNITED STATES PATENT AND TRADEMARK OFFICE
CERTIFICATE OF CORRECTION

PATENT NO. : 7,631,038 B2
APPLICATION NO. : 11/358479
DATED : December 8, 2009
INVENTOR(S) : Dickens et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 960 days.

Signed and Sealed this

Second Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,631,038 B2 | Page 1 of 1 |
| APPLICATION NO. | : 11/358479 | |
| DATED | : December 8, 2009 | |
| INVENTOR(S) | : Christopher Scott Dickens et al. | |

It is certified that error appears in the above-identified patent and that said Letters Patent is hereby corrected as shown below:

In column 12, line 44, in Claim 9, delete "computer," and insert -- computers, --, therefor.

In column 14, line 5, in Claim 15, delete "re" and insert -- are --, therefor.

In column 14, line 5, in Claim 15, delete "sever," and insert -- server, --, therefor.

Signed and Sealed this
Eighth Day of February, 2011

David J. Kappos
*Director of the United States Patent and Trademark Office*